US005593194A

United States Patent [19]

Liau

[11] Patent Number: 5,593,194

[45] Date of Patent: Jan. 14, 1997

[54] DOOR LOCATING DEVICE

[76] Inventor: Wan-Lai Liau, 3F., No. 6, Torng Yang Road, Nan Gaang District, Taipei, Taiwan

[21] Appl. No.: 581,978

[22] Filed: Jan. 2, 1996

Related U.S. Application Data

[63] Continuation-in-part of Ser. No. 301,452, Sep. 6, 1994, abandoned.

[51] Int. Cl.[6] .......... C05C 1/08

[52] U.S. Cl. .......... 292/340; 292/341.14; 292/163; 292/DIG. 15

[58] Field of Search .......... 292/DIG. 15, 163, 292/254, 340, 341.14, 341.15, DIG. 45

[56] References Cited

U.S. PATENT DOCUMENTS

| | | | |
|---|---|---|---|
| 587,131 | 7/1897 | Market . | |
| 2,338,851 | 1/1944 | Heyer | 70/14 |
| 2,558,361 | 6/1951 | Johnston | 292/74 |
| 2,845,789 | 8/1958 | Kistner | 70/90 |
| 3,178,213 | 4/1965 | Nelson | 292/18 |
| 5,081,241 | 5/1991 | Baines | 292/DIG. 15 X |
| 5,120,093 | 6/1992 | Carney | 292/60 |
| 5,490,304 | 2/1996 | Winner, Jr. et al. | 292/DIG. 15 X |

*Primary Examiner*—Rodney M. Lindsey
*Assistant Examiner*—Monica E. Millner
*Attorney, Agent, or Firm*—Pro-Techtor International

[57] ABSTRACT

A door locating device includes an anchorage hole provided on the concrete or ground. An outer sleeve is anchored into the anchorage hole. This outer sleeve has hollow configuration is provided with outer thread. The bottom of the sleeve is provided with a bottom plate which has a flange. The flange is provided with a plurality of threaded hole. A fixing plate having a threaded hole at the center portion thereof. Both side portions of the plate are provided with through holes. The threaded hole is screwed into the outer thread of the outer sleeve. The immediate sleeve to be incorporated with the outer sleeve. The immediate sleeve is provided with longitudinal slot at its inner wall. The longitudinal slot has an enlarged cut which forms upper and lower positioning edges. A spring is disposed within the bottom of the sleeve. A top press block has a traverse slot. The upper and lower portion of the block has a first and a second posts which have different diameter one another. The interconnection between the first and second posts forms a biasing ring to bias the spring. The first post has a boss at its side wall which can move up and down within the through slots. When the device is assembled, the outer sleeve is inserted into anchorage hole first, then is filled with concrete in such a manner that the threads are filled with concrete.

5 Claims, 5 Drawing Sheets

DOOR LOCATING DEVICE

This is a continuation-in-part application of applicant's U.S. patent application Ser. No. 08/301452, filed on Sep.06, 1994, now abandoned.

BACKGROUND OF THE INVENTION

This invention relates to a door locating device, more particularly, to a device which calm avoid the intruding of the object into the positioner. On the other hand, the positioner is incorporated with a reinforced lock or retaining result.

In U.S. patent application Ser. No. 587,131 entitled with "Door Stop" is a typical positioner. The tubular portion 15 is simply fixed by a screw 28 to the ground. Since the connection between the tubular portion 15 and ground is limited by said screw 28 only, it tends to loosen after sustaining a lot of heavy load. Consequently, the screw 28 will come out from this retaining position and case the tubular portion 15 loosen also. The big defect which this conventional art is when the plate 33 is sustained heavy load by vehicle and heavy load, the plate 33 will be depressed to form a permanent deformation. Accordingly, a gap is formed (the spring 27 will retracted), consequently, the debris, small stone and dirt will fall into the tubular portion 15. Accordingly, the up and down displacement between the tubular portion will be malfunctioned. As a result, the shank 10 can not enter into the tubular portion 15.

On the other hand, U.S. Pat. No. 2,558,361, entitled with "Lacking Mechanism of Spring Pro-Jected Latching Bolt Type" has disclosed a device wherein the keeper 10 is anchored to the ground. The keeper 10 is provided with cupped portion 11. The bearing 22 is fixed to the lower edge of the rotating door. The bearing 22 is provided with a through hole 23. The side of the latching bolt 16 is provided with slot 19. A spring 26 is inserted into the tube of the latching bolt 16. The spring 26 is connected with a disk 27. The pin 28 is inserted traverse in the aperture 23 and the slot 19. When the door is closed, the front edge of the head of the latching bolt 16 is retracted as in contacting with the bossing edge of the keeper 10 (This is because the function of the spring 26). In the stage, the pin 28 is located in the upper edge of the slot 19. When the front edge of the head enters into the cupped portion 11, the spring 26 will resume to its original position. Since the head is located in the cupped portion 11, the door is fixed temporary.

As we understand that the pin is fixed firmly, by the retraction of the spring 26, the latching bolt 16 can be engaged or dis-engaged the keeper 10. On the other hand, the slot 19 has an L-shape configuration and when it is engaged with the tab 13, the pin 28 will enter into the side hole of the slot 19. By this arrangement, the latching bolt 16 is prevented from retracting.

From the above description, we may readily find that this device is only designated for room door, not for gate of building. From this viewpoint, the cited patent is completely different with the present invention. If the device disclosed in the cited reference is applied to the metal gate. The keeper 10 will surely be deformed by the heavy load resulted from the vehicle bulky size weight. More and more dirt, small stones will accumulate into the cupped portion 11 and the tube of the latching bolt 16. This will jeopardize the relative displacement between the latching bolt 16 and bearing 22.

In U.S. Pat. No. 1,631,370, entitled with Sash Fastener, it discloses an interposed frame 1, 2 which can move relatively. The tubular body 3 is inserted into the bore 4. The bore 4 is disposed within sash 1 and the pin 5 is retained within the tubular body 3. The outer wall of the pin 5 is provided with inclined slot 5 and as it rotates inward or outward, the pin 5 is extended into the tubular body 3. Accordingly, the sash 2 is readily moved upward. To the country, when the pin 5 is projected into the sash 1, the lower sash 2 is prevented to move upward. This is completely different with the scope of this invention. This is an application between the sash which moves up and downward.

U.S. Pat. No. 5,120,093, entitled with Floor-Mounted Positive Doorstop, even the application is identical with the present invention, it can be concluded with the following defects.

1. The sleeve 12 is flat which can not provide an effective connection with the concrete. Especially, when the flat side 22 is in contacting with the flat side 22, a gap may be found as the flatness of the ground is not enough. On the other hand, when the flat side 22 is sustained the weight from the vehicle and heavy load, it is readily deformed. Accordingly, the sleeve 12 is readily loosened and come off.

2. In FIG. 1 of the above mentioned reference, when the pin 56 is located within the elongated hole 36, the plunger 40 is blocked to move up and down. In this situation, the upper portion of the plunger 40 is projected the flange 20. When the vehicle runs over it, the plunger 40 is forced to depress and break the pin 56.

3. Whether the pin 56 will be located within the hole 28 or dogleg 36, it is actuated by the rotation and move up and down of the plunger 40. But this shall be done by special tool. This is another defect.

SUMMARY OF THE INVENTION

It is the object of this invention to provide a door locating device which can effectively prevent the debris, dirt fall into the tubular portion of the door locating device.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a door locating device, wherein.

DETAILED DESCRIPTION OF PREFERRED EMBODIMENT

Figure 1:
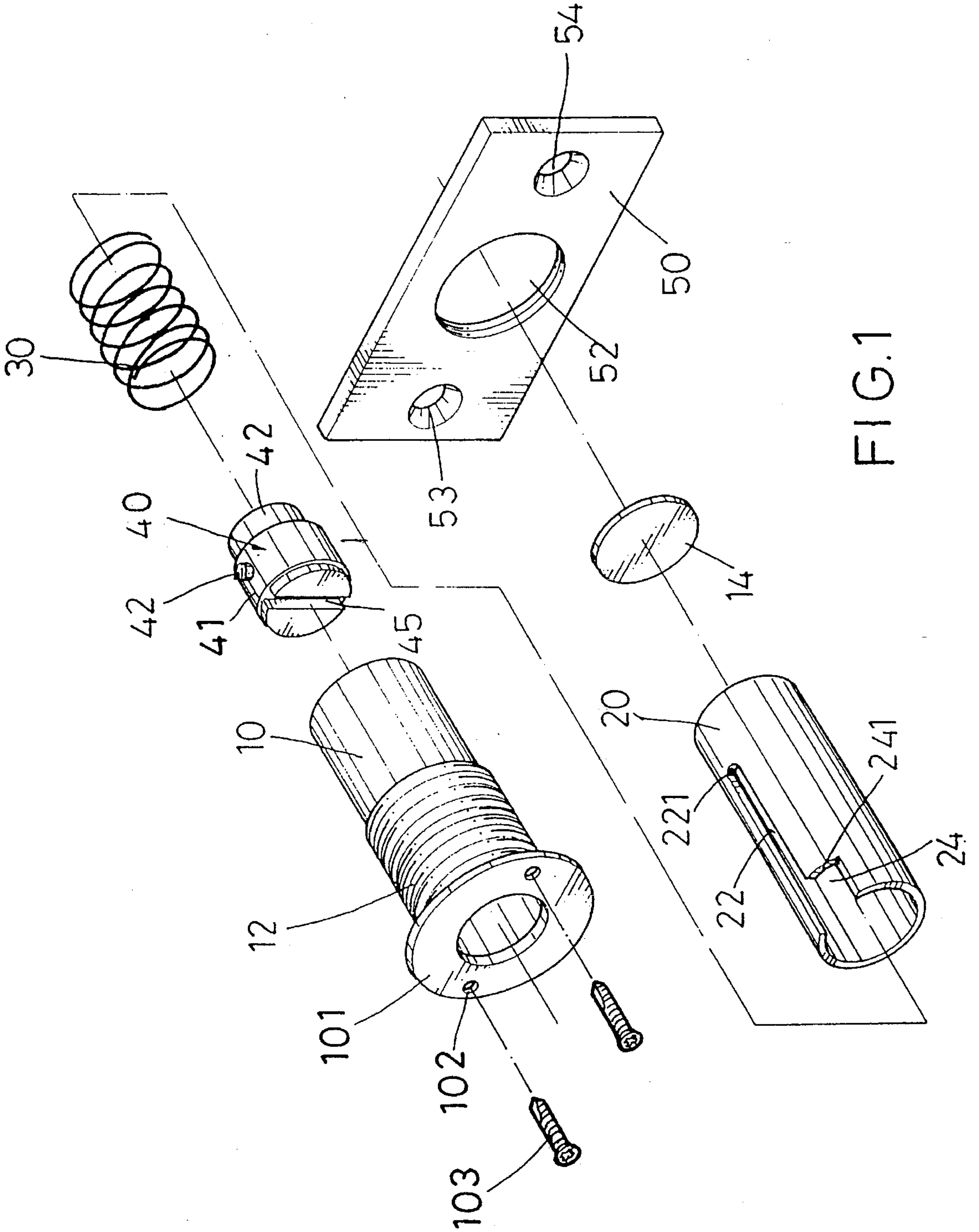
FIG. 1 is an exploded perspective view of the door locating device made according to this invention.
Figure 2:
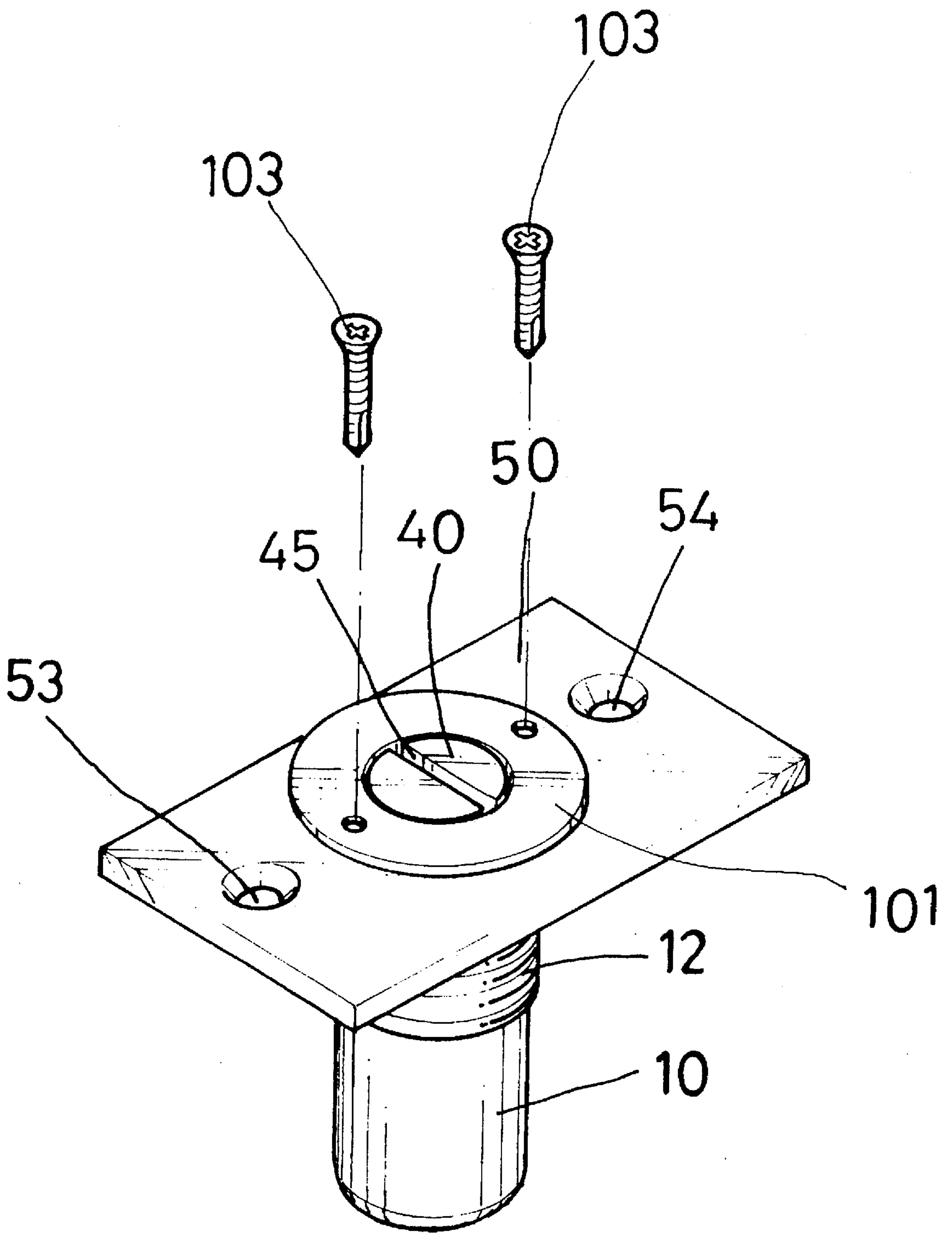
FIG. 2 is a perspective view of the door locating device made according to this invention.

Referring to FIGS. 1 and 2, the door locating device made according to this invention includes an anchorage hole provided on the concrete or ground. An outer sleeve 10 is anchored into the anchorage hole. This outer sleeve 10 has hollow configuration is provided with outer thread. The bottom 14 of the sleeve 10 is provided with a bottom plate 14 which has a flange 101. The flange 101 is provided with a plurality of threaded holes 102. A fixing plate 50 has a threaded hole 52 at the center portion thereof. Both side portions of the plate 50 are provided with through holes 53, 54. The threaded hole 52 is screwed into the outer thread 12 of the outer sleeve 10. The immediate sleeve 20 to be incorporated with the outer sleeve 10. The immediate sleeve 20 is provided with longitudinal slot 22 at its inner wall. The longitudinal slot 22 has an enlarged cut 24 which forms upper and lower positioning edges 211, 221. A spring 30 is disposed within the bottom of the sleeve 20. A top press block 40 having a transverse slot 45. The upper and lower portion of the block has a first and a second posts 41, 43 which have different diameter one another. The interconnection between the first and second posts 41, 43 forms a biasing ring 301 to bias the spring 30. The first post 41 has a boss 42 at its side wall which can move up and down within the through slots 22, 24. When the device is assembled, the outer sleeve 10 is inserted into anchorage hole first, then is filled with concrete W to fix it. As the sleeve 10 has outer threads 12, the concrete W is filled within the threads 12.

On the other hand, during the filling of the concrete, a first screw 58 can be screwed into the concrete W to make the concrete filled into the thread.

Besides, a second screw 103 can be applied to the hole 102 and further lock into the positioning plate 50.

When the top press block 40 is undertaking the weight without moving downward, then the operator can use an insert 60 inserting into the traverse slot 45 and rotate it. Then the boss 42 is rotated and rested on the positioning edge 241. When the top press block 40 is undertaking the weight and moving downward, an insert 60 can be applied into the traverse slot 45 and rotate counterclockwise, then the boss 42 is capable of moving up and down within the slot 22.

By this arrangement, when the pin 42 of the top press block 40 is rested on the positioning edge 241, the top press block 40 is prevented from moving downward. Accordingly, the debris and dirt are prevented from entering into it.

The present invention can be concluded with the following advantages.

Figure 3:
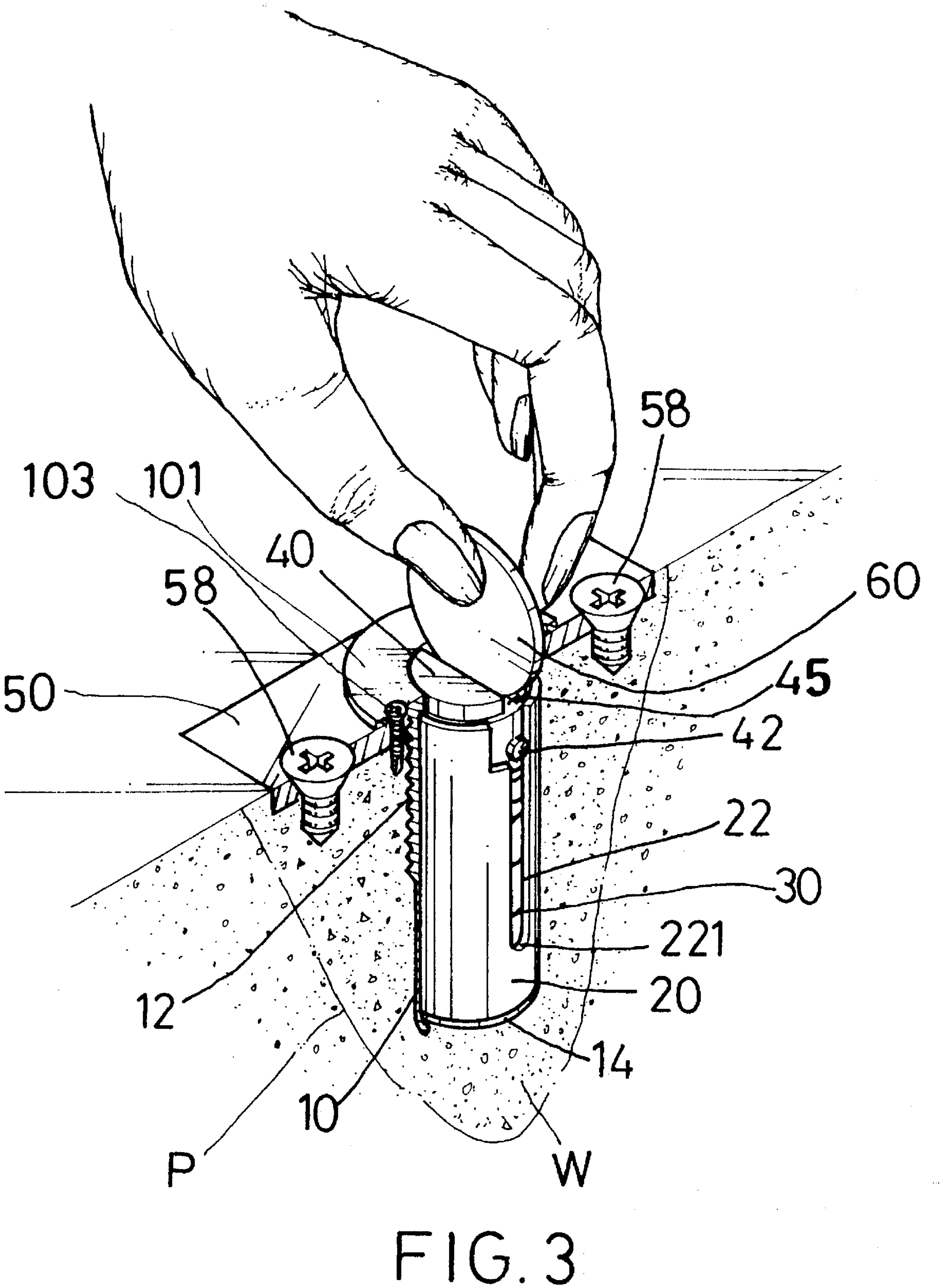
FIG. 3 is a partially cross sectional view.
Figure 4:
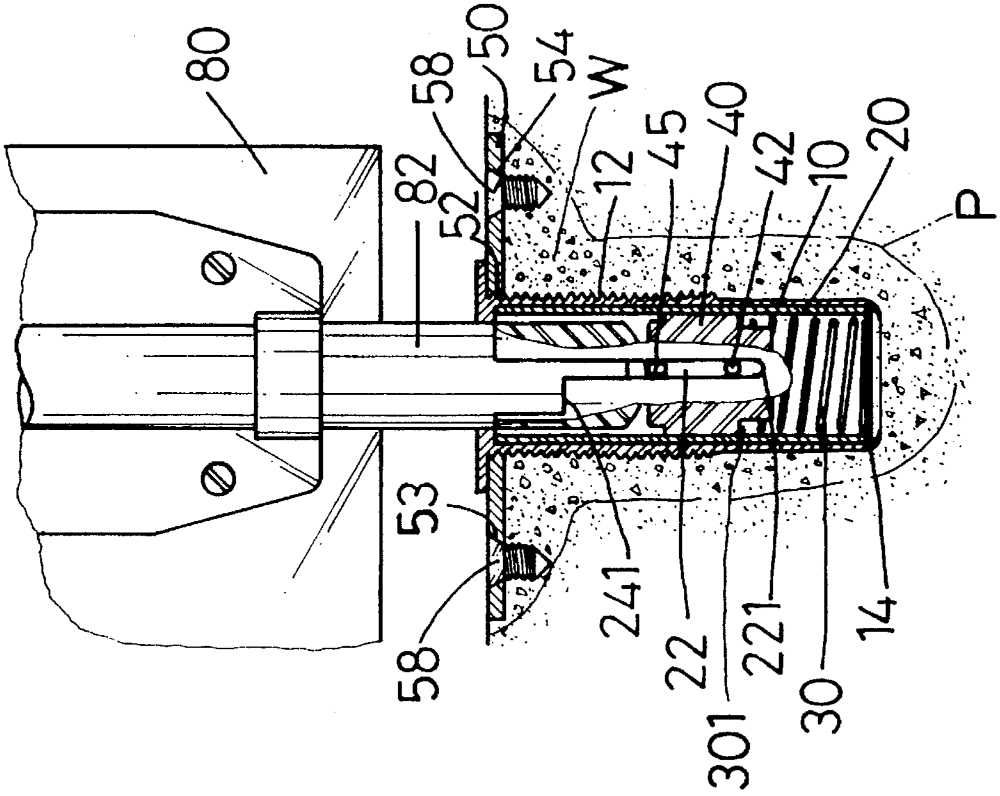
FIG. 4 is a cross sectional view wherein the positioning lever is actuating to the door locating device of this invention.
Figure 5:
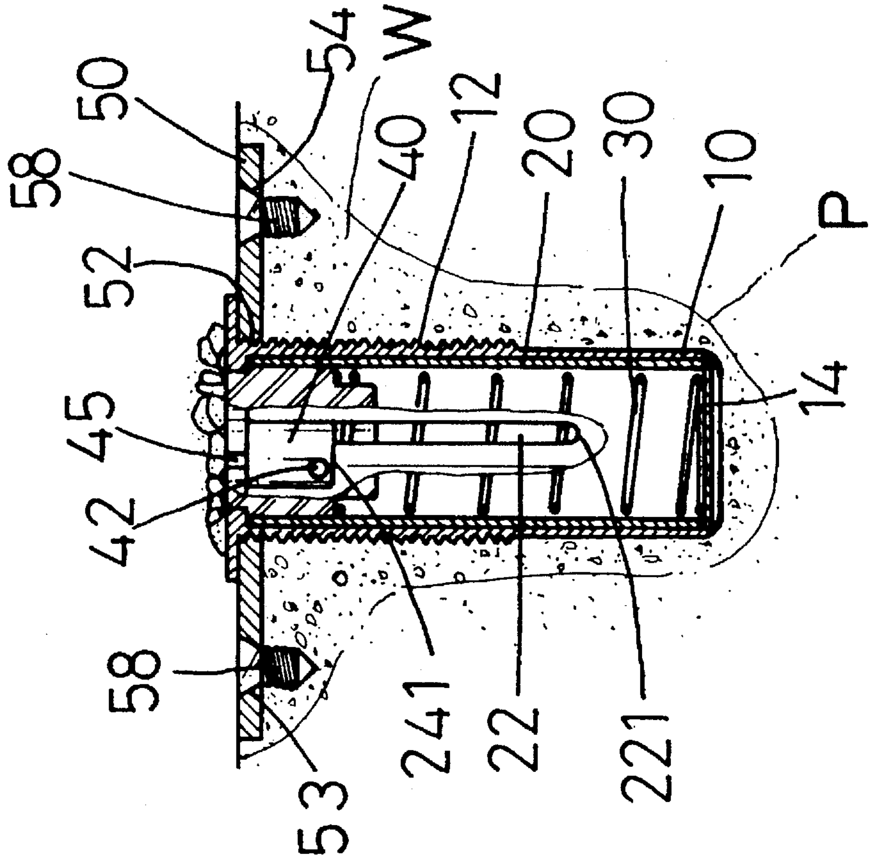
FIG. 5 is a cross sectional view showing an embodiment wherein the small post of the top biasing block is positioned on the positioning edge.

1. Referring to FIGS. 3, 4 and 5, the threads of the outer screw 12 and the screw 58 are meshed with the concrete as it merges into the concrete W. By this arrangement, the outer sleeve 10 is firmly anchored onto the ground. On the other hand, by the help of the screw 103, the connection between the outer sleeve 10 and the ground is further enhanced. Even when it sustains the heavy load from vehicle, it still firmly fixes onto the ground.

2. Referring to FIGS. 2 and 3, the door locating device is mounted under the ground right under the positioning lever of the metal door to be installed later. The outer sleeve 10 is integral with the concrete. When the operator would like to mount the positioning lever 82 into the immediate lever 20, only use an insert (screw tip or coin) to insert into the traverse slot 45 to rotate it, then the boss 42 is passing into the slot 22, as clearly shown in FIG. 4. When the positioning lever 82 is pressed onto the top press block 40, the top press block 40 will move downward as the spring 30 retracts. Then the positioning lever 82 is firmly retained by the immediate sleeve 20 and door 80 is kept open.

3, When the door is open and no vehicle and passenger passing, then the operator can pull up the positioning lever 82 to release the lever 82 from the immediate sleeve 20. Then the operator can use the same insert to rotate the traverse slot 45 counterclockwise, then the second post 42 will rest on the positioning edge 241, as clearly shown in FIG. 5. Then the top press block 40 is prevented from moving downward. Then when the door is opened and the vehicle and passenger pass on it, no debris will come into the outer sleeve 10 as the top press block 40 forms a strong barrier.

4. The top press block 40 can be set in a floating position which can still prevent the debris falls into the outer sleeve.

I claim:

1. A door locating device, including an anchorage hole provided on the concrete or ground;

an outer sleeve being anchored into the anchorage hole, the outer sleeve being provided with threads at its outer wall, the bottom of said sleeve being provided with a bottom plate which has a flange thereof, said flange being provided with a plurality of threaded holes;

a fixing plate having a threaded hole at the center portion thereof, and side portion both side portions of the fixing plate being provided with through holes said outer sleeve being screwed into said threaded hole;

an immediate sleeve to be incorporated with the outer sleeve, said immediate sleeve being provided with longitudinal slot at its inner wall, said longitudinal slot being provided with an enlarged cut which forms upper and lower positioning edges;

a spring being disposed within the bottom of said immediate sleeve, a top press block having a transverse slot an upper and a lower portion of said block having a first and second posts which have different diameter from one another, an interconnection between the first and second posts forming a biasing ring to bias the spring, said first post having a boss at its side wall which can move up and down within the longitudinal slot;

when the device is assembled, the outer sleeve is inserted into said anchorage hole first, then is filled with concrete in such a manner that the concrete is filled within said threads of said outer sleeve.

2. A device as recited in claim 1, further comprises a first screw which can be screwed into the concrete to make the concrete fill into the threads of said first screw.

3. A device as recited in claim 1, further comprises a second screw which can be screwed into the threaded holes of the outer sleeve and fixed onto the positioning plate.

4. A device as recited in claim 1, wherein the top press block is undertaking a weight without moving downward, then and operator can use an insert inserting into the traverse slot and rotate it, then a boss is rotated and rested on a positioning edge, when the top press block is undertaking the weight and moving downward, the insert can be applied into the traverse slot and rotate counterclockwise, then the boss is capable of moving up and down within the longitudinal slot.

5. A device as recited in claim 1, wherein the boss of the top press block is rested on a positioning edge to prevent the block from moving downward, so that the debris and dirt are prevented from falling into said outer sleeve.

* * * * *